United States Patent
Chang et al.

(10) Patent No.: US 8,966,661 B2
(45) Date of Patent: Feb. 24, 2015

(54) SYSTEM FOR FABRICATING NANOSCALE PROBE AND METHOD THEREOF

(71) Applicant: Academia Sinica, Taipei (TW)

(72) Inventors: Wei-Tse Chang, Taipei (TW); Ing-Shouh Hwang, Taipei (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 13/948,991

(22) Filed: Jul. 23, 2013

(65) Prior Publication Data

US 2014/0033374 A1    Jan. 30, 2014

(30) Foreign Application Priority Data

Jul. 27, 2012    (TW) .............................. 101127119 A (51) Int. Cl.
 *G01Q 70/10* (2010.01)
 *G01Q 70/16* (2010.01)
 *B82Y 35/00* (2011.01)

(52) U.S. Cl.
 CPC ................ *G01Q 70/10* (2013.01); *G01Q 70/16* (2013.01); *B82Y 35/00* (2013.01)
 USPC .................................. 850/57; 850/56; 850/60

(58) Field of Classification Search
 USPC ................................................ 850/56, 57, 60
 See application file for complete search history.

(56) References Cited

U.S. PATENT DOCUMENTS 5,462,467 A  *  10/1995  Macaulay et al. ............... 445/50

OTHER PUBLICATIONS

J.P. Ibe, P.P. Bey Jr., S.L. Brandow, R.A. Brizzolara, N.A. Burnham, D.P. Dilella, K.P. Lee. C.R.K. Marrian and R.J. Colton, On the electrochemical etching of tips for scanning tunneling microscopy. J. Vac. Sci. Technol. A 8, 3570 (1990).
A.I. Oliva, A.R. Romero and J.L. Pena, Electrochemical preparation of tungsten tips for a scanning tunneling microscope, Rev. Sci. Instrum. 67, 1917 (1996).
D.I Kim and H. S. Ahn, Etching voltage control technique for electrochemical fabrication of scanning probe microscope tips, Rev. Sci. Instrum. 73, 1337 (2002).
F. Bastiman, A.G. Cullis and M. Hopkinson, Two step optimized process for scanning tunneling microscopy tip fabrication, J. Vac. Sci. Technol. B 28, 371 (2010).
L. Anwei, H. Xiaotang, L. Wenhui and J. Guijun, An improved control technique for the electrochemical fabrication of scanning tunneling microscopy microtips, Rev. Sci. Instrum. 68, 3811 (1997).
Y. Nakamura, Y. Mera and K. Maeda, A reproducible method to fabricate atomically sharp tips for scanning tunneling microscopy, Rev. Sci. Instrum. 70, 3373 (1999).

(Continued)

*Primary Examiner* — Kiet T Nguyen
(74) *Attorney, Agent, or Firm* — Muncy, Geissler, Olds & Lowe, P.C.

(57) ABSTRACT

Disclosed is a method for fabricating a nanoscale probe. A first conductor and a second conductor are immersed into an electrolyte contained in an electrolytic tank. The first conductor and the second conductor are connected to a power source respectively. An electrolytic reaction is established when an electrical circuit is established between the first conductor and the second conductor. The second conductor is configured to output electrons. The first conductor is configured to receive electrons. Therefore, the first conductor is etched when the electrical circuit is established between the first conductor and the second conductor. A necking portion is created at the first conductor approximately near the surface of the electrolyte. A nanoscale probe is fabricated when first conductor breaks at the necking portion.

6 Claims, 7 Drawing Sheets

(56) References Cited

OTHER PUBLICATIONS

S.L. Toh, H. Tan, J.C. Lam, L.C. Hsia and Z.H. Mai, Optimization of AC Electrochemical Etching for Fabricating Tungsten Nanotips with Controlled Tip Profile, J. Electrochem. Soc. 157, E6 (2010).

W.X. Sun, Z.X. Shen, F.C. Cheong, G.Y. Yu, K.Y. Lim, and J.Y. Lin, Preparation of cantilevered W tips for atomic force microscopy and apertureless near-field scanning optical microscopy, Rev. Sci. Instrum. 73, 2942 (2002).

B.F. Ju, Y.L. Chen and Y. Ge, The art of electrochemical etching for preparing tungsten probes with controllable tip profile and characteristic parameters, Rev. Sci. Instrum. 82, 013707 (2011).

Wei-Tse Chang, Ing-Shouh Hwang, Mu-Tung Chang, Chung-Yueh Lin, Wei-Hao Hsu., Method of electrochemical etching of tungsten tips with controllable profiles, Rev. Sci. Instrum. 83, 083704 (2012).

* cited by examiner

SYSTEM FOR FABRICATING NANOSCALE PROBE AND METHOD THEREOF

FIELD

The present disclosure relates to a system for fabricating nanoscale probes, and more specifically to a system for fabricating nanoscale probes electrochemically.

BACKGROUND

Nanoscale probes, sometimes referred to as nano-probes or nanoscale tips, play a key role in modern technology. For example, a scanning probe microscope (SPM), which is used for detecting the electrical, optical or magnetic characters of a target sample, relies on nanoscale probes to detect and analyze the surface of such target sample. Nanoscale probes are also used for other applications such as miniature emitters of electrons, ion beams, point contacts in conductance measurements, and so on.

The radius of a nanoscale probe is generally measured by nano-meters. Consequently, a scanning electron microscope (SEM) is applied to help identify the profiles of the nanoscale probe. Such profiles include radius of curvature (ROC), length, aspect ratio, surface roughness, and taper angle. Different profiles of nanoscale probes affect the performance of the device being applied to. As an example, with SPM, different profiles of nanoscale probes affect the roughness information, topography information, or contour information of the surface of the target sample that is being detected. To fabricate nanoscale probes with specific profiles, an improved apparatus and method continue to be sought.

DETAILED DESCRIPTION OF THE DISCLOSURE

Disclosed in the present disclosure is a nanoscale probe. The nanoscale probe has a radius of curvature of the tip under a predetermined limit. The nanoscale probe also has a taper angle of the tip that is between a certain range. Different profiles of the nanoscale probes are desirable for different applications. For example, long and skinny nanoscale probes are used for multiple-probe measurements of surface conductance on nano-structures because such probes can be placed close to one another. In some embodiments, a ion source emitter may require nanoscale probes with a rough surface and a larger tip taper angle for better performance.

Disclosed in the present disclosure is a method of electrochemically fabricating nanoscale probes. The fabrication method according to the present disclosure provides a control of the nanoscale probe profile through the adjustment of the electrochemical etching parameters.

Figure 1A:
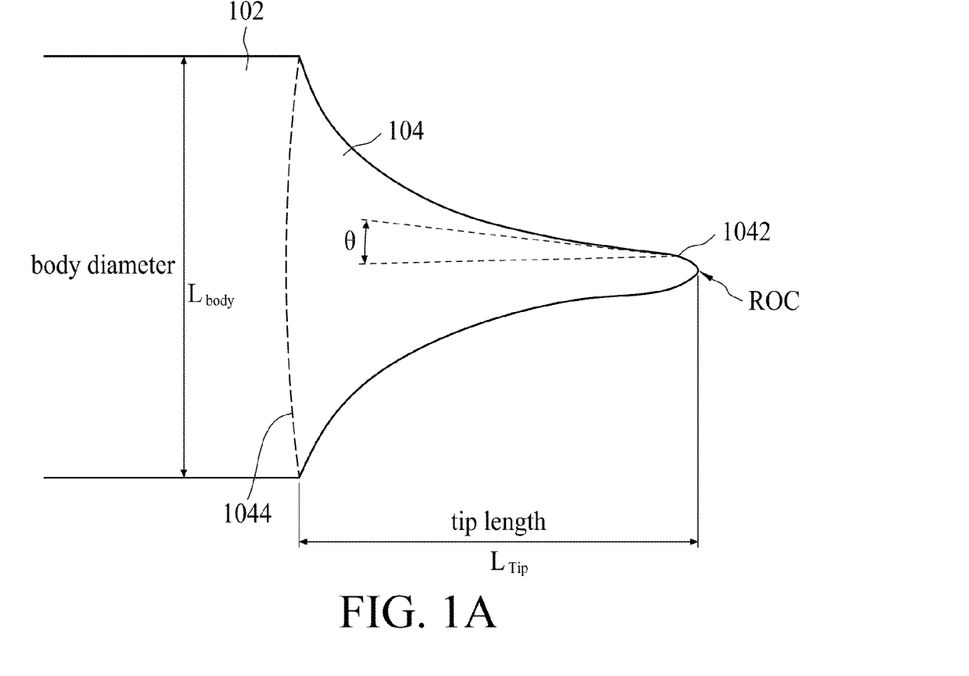
FIGS. 1A-1D illustrate exemplary nanoscale probes of different profiles according to some embodiments of the present disclosure.

FIG. 1A is an exemplary embodiment of a nanoscale probe 100. The nanoscale probe 100 has an elongated cylindrical body 102. The diameter Lbody of the body 102 generally ranges from 0.1 millimeter to 1 millimeter. A tip 104 protrudes from one end of the body 102. The tip 104 gradually reduces in dimension and forms an apex 1042 at one end of the tip 104. The contacting surface between the tip 104 and the body 102 is a bottom 1044 of the tip 104. To be more specific, the bottom 1044 of the tip 104 is where the tip 104 has the largest diameter, that is, where the diameter of the tip 104 is about the same as a body diameter Lbody of the body 102. The tip length Ltip of the tip 104 is measured from the bottom 1044 of the tip 104 to the apex 1042. Moreover, radius of curvature (ROC) of a tip is measured substantially at the apex 1042. The ROC at the tip is the radius of a circle that mathematically fits the most effectively for the curve at its apex. Generally, a tip having a smaller radius of curvature is less blunt. A tip taper angle ($\theta$) is also measured substantially at the apex 1042. Generally, the dimension of the tip of a nanoscale probe having a smaller tip taper angle reduces more than that of a nanoscale probe having a larger taper angle as the tip 104 protrudes farther, i.e., away from the body 102.

The nanoscale probe 100, i.e., the body 102 and the tip 104, has different profiles, which are described below.

Figure 1B:
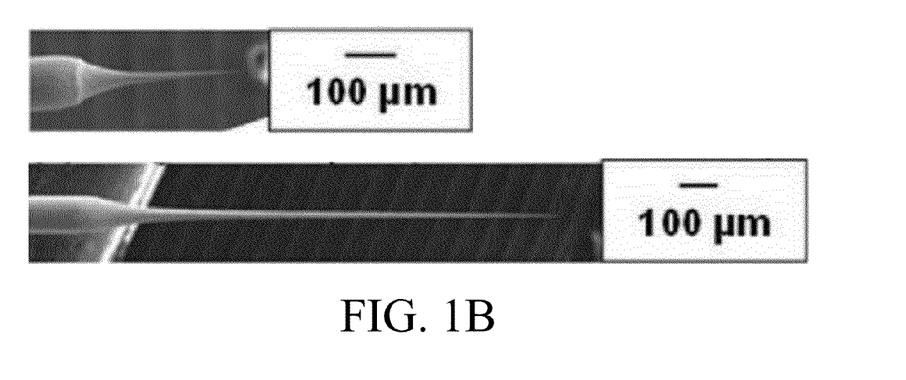

With reference to FIG. 1A, by dividing the tip length Ltip by the body diameter Lbody, an aspect ratio (AR) of the nanoscale probe 100 is acquired. FIG. 1B provides images of nanoscale probes having different aspect ratios under the electronic microscope according to some embodiments of the present disclosure. Specifically, the upper figure in FIG. 1B is a nanoscale probe with a specific aspect ratio, and the lower figure in FIG. 1B is a nanoscale probe with an aspect ratio that is higher than that in the upper figure.

Figure 1C:
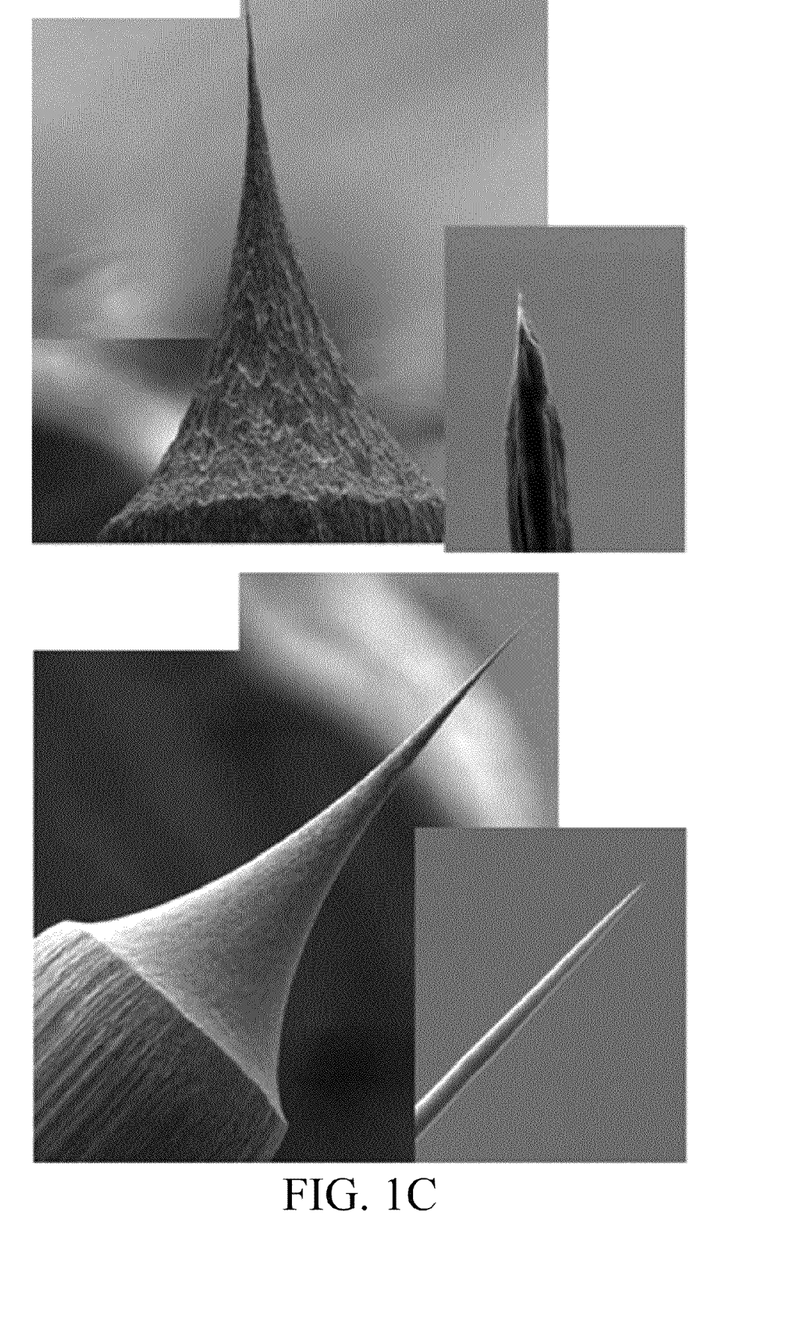

FIG. 1C provides images of nanoscale probes having different degrees of tip roughness under an electronic microscope according to some embodiments of the present disclosure. Specifically, the upper figure in FIG. 1C is a nanoscale probe with a specific tip roughness, and the lower figure in FIG. 1C is a nanoscale probe with a tip roughness that is lower than that in the upper figure.

Figure 1D:
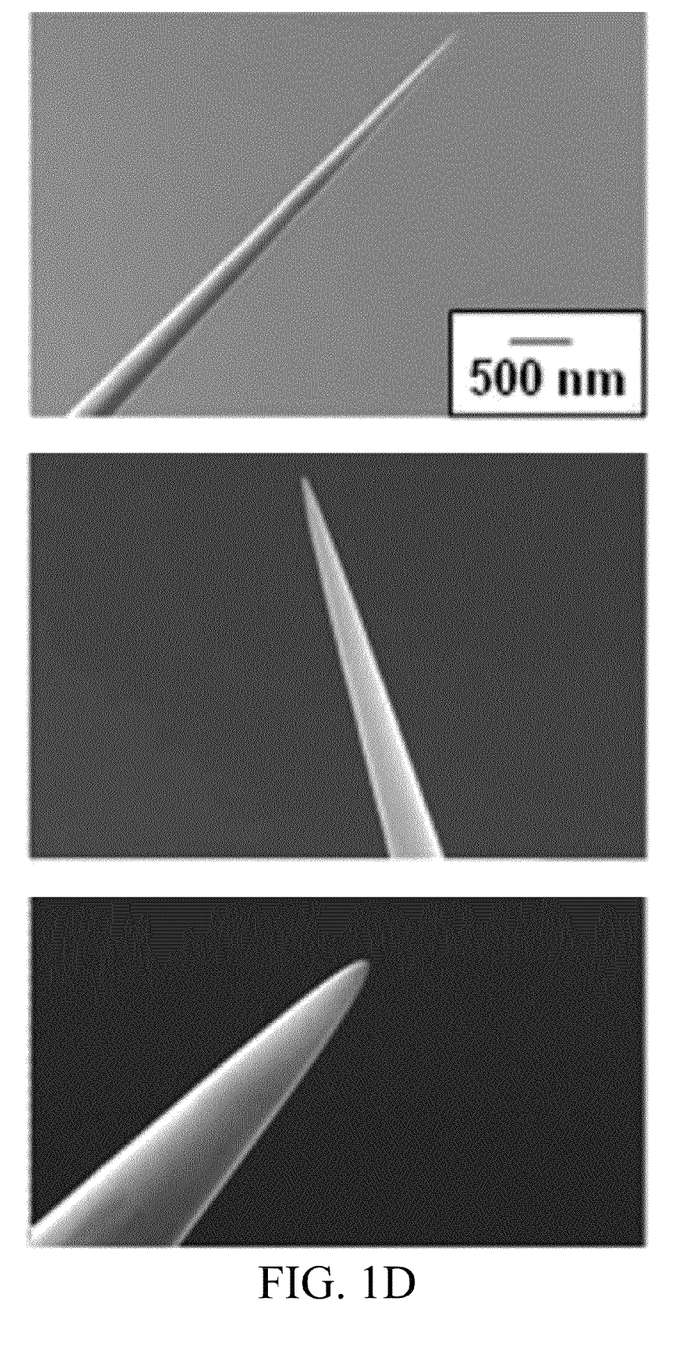

FIG. 1D provides images of tips having different taper angles and radiuses of curvature under an electronic microscope according to some embodiments of the present disclosure. Specifically, the upper figure in FIG. 1D is a tip taper angle of about 3.2 degrees and a radius of curvature of about 7.8 nanometers. The middle figure in FIG. 1D is a tip taper angle that is larger than that of the tip in the upper figure, and a radius of curvature that is smaller than that of the tip in the upper figure. The bottom figure in FIG. 1D is a tip taper angle that is larger than that of the tip in the upper figure, and a radius of curvature that is larger than that of the tip in the upper figure.

According to some embodiments of the present disclosure, the nanoscale probe 100 has a tip length Ltip between 100 micrometers and 1 centimeter, and a body diameter Lbody between 2 micrometers and 10 millimeter. An aspect ratio of the nanoscale probe 100 is no greater than 1000. In addition, the nanoscale probe 100 has a tip radius of curvature between 4 nanometers and 50 nanometers, and a tip taper angle between 3 degrees and 20 degrees. According to some other embodiments of the present disclosure, the nanoscale probe 100 has a tip length Ltip between 100 micrometers and 1 millimeter, and a body diameter Lbody between 2 micrometers and 10 micrometers. An aspect ratio of the nanoscale probe 100 is between 1.6 and 100. According to additional embodiments of the present disclosure, the nanoscale probe 100 has a tip radius of curvature no greater than 10 nanometers, and a tip taper angle between 3 degrees and 5 degrees.

According to some embodiments of the present disclosure, the nanoscale probe 100 is made of a transition metal, such as tungsten, molybdenum, niobium and so on. Specifically, tungsten is used as the material for nanoscale probes 100 in some embodiments of the present disclosure due to its high material strength and a high melting point. In some other embodiments according to the present disclosure, the nanoscale probe 100 is made of a noble metal such as iridium. In yet some other embodiments according to the present disclosure, the nanoscale probe 100 is made of more than one transition metal and/or noble metal.

Figure 2:
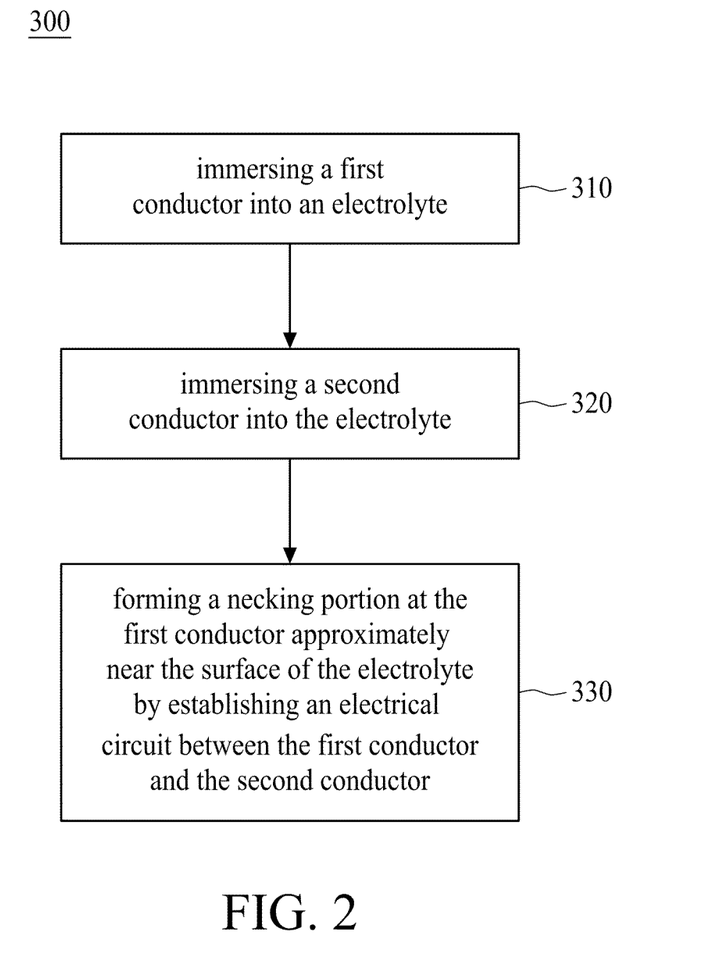
FIG. 2 is an exemplary method for fabricating nanoscale probes electrochemically according to some embodiments of the present disclosure.
Figure 3A:
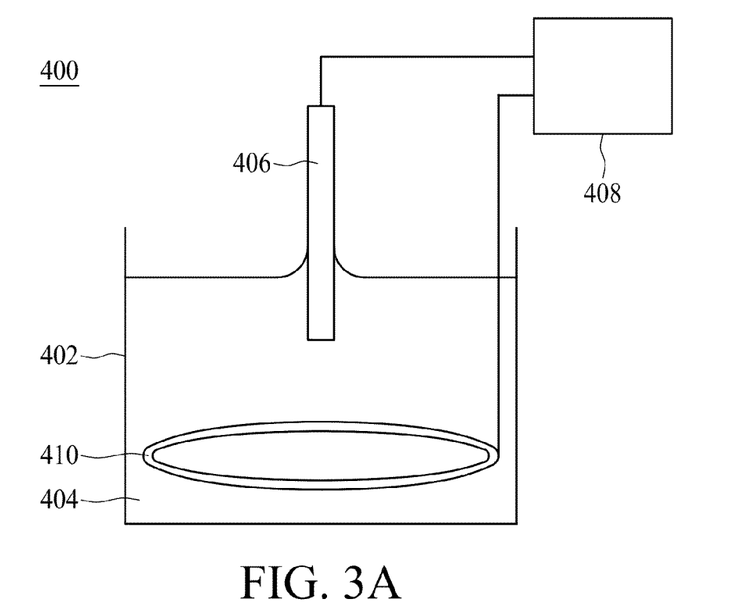
FIGS. 3A-3C illustrate exemplary systems for implementing an exemplary method for fabricating nanoscale probes electrochemically according to some embodiments of the present disclosure.
Figure 3B:
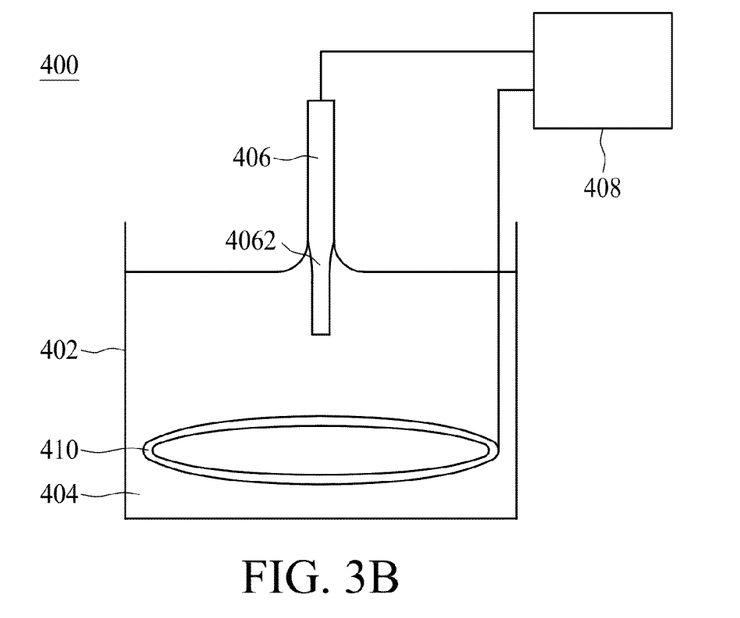
Figure 3C:
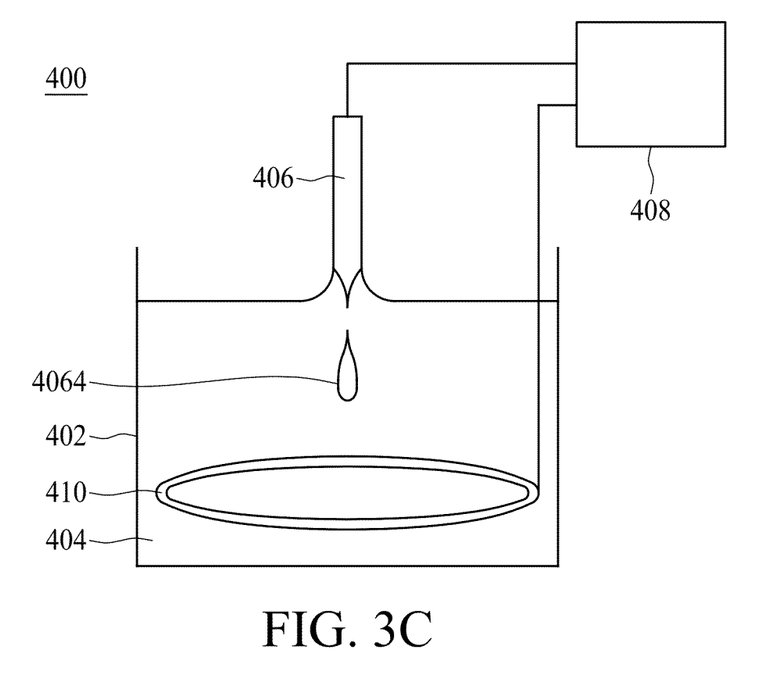

FIG. 2 is a method 300 of fabricating nanoscale probes electrochemically according to some embodiments of the present disclosure. FIGS. 3A-3C are some embodiments of the system 400 for implementing the fabrication method 300. It is to be noted that when discussing the fabrication method 300, the numeral labels in FIGS. 3A-3C are incorporated references.

In operation 310, a first conductor is immersed into an electrolyte to act as a receiver of electrons in an electrolytic reaction. With reference to FIG. 3A, in some embodiments of the operation 310, one end of the first conductor 406 is immersed into the electrolyte 404, which is contained in an electrolytic tank 402. The first conductor 406 is electrically connected to a power source 408. As illustrated in FIG. 3A, the first conductor 406 is substantially in the shape of a wire. A person having ordinary skill in the art would appreciate that the first conductor 406 can be conical or in various shapes that are suitable as a base of nanoscale probes of specific profiles according to some embodiments of the present disclosure.

In operation 320, a second conductor is immersed into the electrolyte 404 to act as an output of electrons in the electrolytic reaction. With reference to FIG. 3A, in some embodiments of the operation 320, the second conductor is entirely immersed into the electrolyte 404. The second conductor 410 is electrically connected to the power source 408. As illustrated in FIG. 3A, the second conductor 410 is circular in shape. A person having ordinary skill in the art would appreciate that the second conductor 410 can be in various shapes, such as a wire, a board or any shape that is suitable for a more uniform electrical field and thus more uniform electrolytic reaction, i.e., etching of the first conductor 406.

In operation 330, a power source is configured to deliver an output to establish an electrical circuit between the first conductor and the second conductor to generate an electrolytic reaction and to etch the first conductor. With reference to FIG. 3B, in some embodiments of the operation 330, the power source 408 delivers an output to establish an electrical circuit between the first conductor 406 and the second conductor 410 to etch a necking portion 4062 at the first conductor 406. The outputs from the power source 408 are in different forms, which include a direct current, an alternating current, pulse wave(s) or combinations thereof. Specifically, in the electrical circuit, the first conductor 406 is configured to receive electrons and the second conductor 410 is configured to output electrons so that part of the first conductor 406 immersed in the electrolyte 404 is etched during the electrolytic reaction. Consequently, the first conductor 406 is electrolyzed, i.e., etched, and the necking portion 4062 is formed approximately near the surface of the electrolyte, as illustrated in FIG. 3B. The power source 408 continues to deliver outputs in order to etch the first conductor 406 at the necking portion 4062 to reduce the dimension of the necking portion 4062. In other words, as the time of the electrolytic reaction increases, the necking portion 4062 becomes thinner overtime. Specifically, the power source 408 delivers different kinds of outputs to reduce the dimension of the necking portion 4062. Such outputs include a direct current, an alternating current, a plurality of pulse waves, or combinations thereof. An operator of the power source 408 configures different combinations and/or durations of the outputs to control at least the etching rate of the first conductor 406 at the necking portion 4062. In addition, different combinations and/or durations of outputs are used to control the profile of the nanoscale probe fabricated through the method 300 according to some embodiments of the present disclosure. Such profiles include the radius of curvature of the tip 104, the taper angle of the tip 104, the length of the tip 104, the aspect ratio of the nanoscale probe 100, and the diameter of the body 102. Accordingly, an operator of the fabrication method 300 is able to fabricate nanoscale probes with predetermined profiles by changing the combinations and/or durations of the output of the power source 408, which establishes the electrical circuit between the first conductor 406 and the second conductor 410. Detailed embodiments of controlling the profile of the fabricated nanoscale probe, according to different combinations and/or durations of outputs by the power source 408, will be discussed herein by FIGS. 4A-4C with reference to FIG. 2 and FIGS. 3A-3C.

Still in operation 330, with reference to FIG. 3C, the first conductor 406 eventually breaks into two parts approximately at the necking portion 4062. The lower part 4064 that breaks off from the first conductor 406 is discarded. The remaining first conductor 406, i.e., the upper part, is now a nanoscale probe ready to be implemented in different applications. During operation 330, the power source 408 continues to deliver outputs and does not terminate such outputs before the lower part 4064 breaks off from the first conductor 406. The power source 408 may be configured to continue or stop delivering outputs after the first conductor 406 breaks into two parts to control the profile of the fabricated nanoscale probe.

According to some embodiments of the present disclosure, the first conductor 406 is made of a transition metal, such as tungsten, molybdenum, niobium and so on. Specifically, tungsten is used as the material for nanoscale probes 100 in some embodiments of the present disclosure due to its high material strength and a high melting point, which is desirable for electrochemical fabrication methods of nanoscale probes. In some other embodiments according to the present disclosure, the first conductor 406 is made of a noble metal such as iridium. In yet some other embodiments according to the present disclosure, the first conductor 406 is made of more than one transition metal and/or noble metal.

According to some embodiments of the present disclosure, the content of the electrolyte 404 is a potassium hydroxide solution (KOH) or a sodium hydroxide (NaOH) solution. The concentration of the electrolyte 404 is no less than 0.1 M. In some embodiments, the concentration of the electrolyte is up to 10 M. An electrolyte having a higher concentration serves to reduce the fabrication time due to a faster etching rate against the first conductor 406 during the electrolytic reaction. In addition, an electrolyte having a higher concentration serves to maintain a more stable meniscus at the air/electrolyte interface during the electrolytic reaction so as to provide better control of the nanoscale probe profiles.

In some embodiments, according to the present disclosure, the power source 408 has a maximum output current of 200 mA. In some other embodiments of the present disclosure, an output current from the power source 408 is less than about 20 mA in order to provide control of the nanoscale probe profiles.

In some embodiments, according to the present disclosure, the output source 408 is a function generator. The function generator is configured to provide a direct current, an alternating current, a plurality of pulse waves, or combinations thereof when establishing the electrical circuit between the first conductor 406 and the second conductor 410. The potential of the output from the power source 408 is between 1V and 50V. In some other embodiments of the present disclosure, the potential of the output from the power source 408 is between 1V and 10V. The potential of the output from the power source 408 affects the roughness of the nanoscale probes fabricated by the method 300 disclosed in the present disclosure. When a lower potential is applied during the operation of the present method 300, the fabricated nanoscale probe will have a surface that is rougher than that of a nanoscale probe fabricated by applying a higher potential.

Figure 4A:
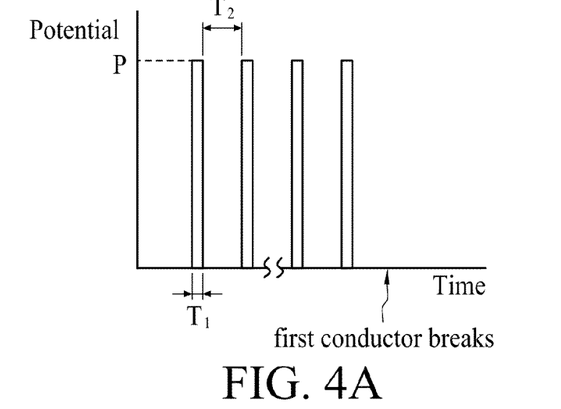
FIGS. 4A-4C illustrate exemplary relationships between the voltage and the duration of outputs applied to an exemplary system for fabricating nanoscale probes according to some embodiments of the present disclosure.
Figure 4B:
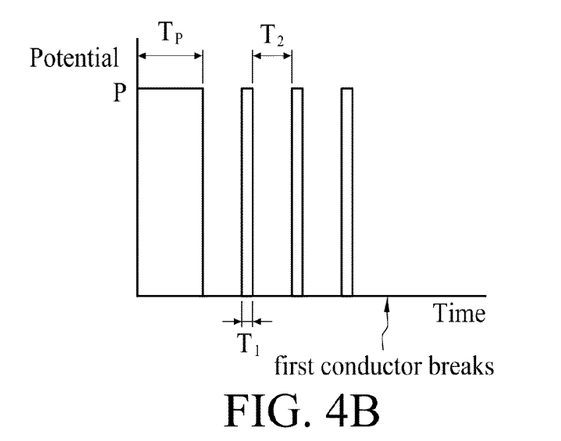
Figure 4C:
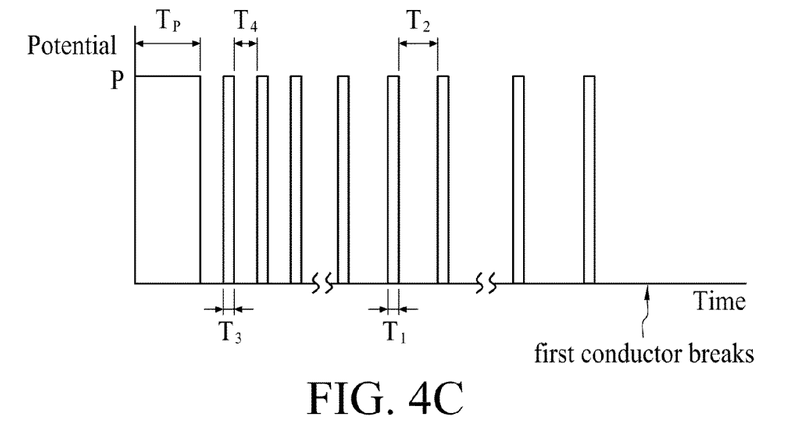

FIGS. 4A-4C are exemplary schematics of the relationship between the potential of the output from the power source 408 and the application time of such outputs in the operation 330 of the fabrication method 300 according to some embodiments of the present disclosure. It is to be noted that when discussing the exemplary embodiments in FIGS. 4A-4C, the numeral labels in FIG. 2 and FIGS. 3A-3C are incorporated references.

Referring to FIG. 4A, in some embodiments, according to the present disclosure with reference to FIG. 2 and FIGS. 3B and 3C, the power source 408 outputs a plurality of pulse waves during the operation 330 of the fabrication method 300 in order to etch the first conductor 406. The x-axis of the chart indicates the duration of the pulse wave outputted by the power source 408, and the y-axis of the chart indicates the voltage of the potential outputted by the power source 408. For example, during an on-time T1, the power source 408 outputs a potential of P volts to etch the first conductor 406. In some embodiments of the present disclosure, by applying pulse waves with shorter on-times T1 respectively, the nanoscale probes fabricated by the fabrication method 300 will have a shorter tip radius of curvature. During an off-time T2, the power source 408 does not output any potential. Alternatively, the power source 408 outputs a very low potential during the off-time T2. According to some embodiments of the present disclosure, the power source 408 continues to output pulse waves from the beginning of the operation 330 until the first conductor 406 eventually breaks into two parts, i.e., until a nanoscale probe is fabricated. The power source 408 would then stop outputting pulse waves in order to prevent the nanoscale probe profiles from being further changed. In some other embodiments, according to the present disclosure, the power source 408 continues to output pulse waves after the first conductor 406 breaks into two parts to further change the nanoscale probe profiles. For example, as the number of pulse waves outputted by the power source 408 (after the first conductor 406 breaks into two parts) increase, the tip of the fabricated nanoscale probe having a taper angle becomes larger.

Referring to FIG. 4A and according to some embodiments of the present disclosure, the on-time T1 is between 1 nanosecond and 1 second. The off-time T2 is a period long enough for a person to discern the breakage of the first conductor 406 under a microscope so as to stop the power source 408 from outputting a next pulse wave after the first conductor 406 breaks into two parts and before the power source 408 delivers the next output. For example, the off-time T2 is more than one second. In other embodiments, according to the present disclosure, a current detector, a voltage detector, or some other suitable mechanism may be applied at the power source 408 to detect the termination of the electrical circuit between the first conductor 406 and the second conductor 410 when the first conductor 406 breaks into two parts. Upon detection, the power source 408 will stop delivering outputs so that the nanoscale probe is maintained at a specific profile. With such detecting mechanisms, the off-time T2 may be less than 1 second. For example, the off-time T2 may be less than 100 milliseconds.

Referring to FIG. 4A and according to some embodiments of the present disclosure, changing the on-time T1 and off-time T2 of the pulse waves serves to change the profiles of the fabricated nanoscale probe. For example, when the on-time T1 of each pulse wave is longer, the tip of the fabricated nanoscale probe will have a larger tip radius of curvature. In other words, the tip will become more blunt.

Referring to FIG. 4B, in some embodiments, according to the present disclosure with reference to FIG. 2 and FIGS. 3B and 3C, the power source 408 outputs a direct current for a certain duration Tp before outputting the plurality of pulse waves during the operation 330. The duration Tp of the direct current is between 0 and 40 seconds. The application of the direct current serves to control some profiles of the fabricated nanoscale probe. For example, applying a longer period Tp of direct current results in a nanoscale probe with a shorter tip length Ltip. In some other embodiments, applying a longer period Tp of direct current results in a nanoscale probe having a larger tip taper angle. In additional embodiments, applying a longer period Tp of direct current results in a nanoscale probe with a shorter tip radius of curvature. The duration Tp of the direct current is freely adjustable as long as the first conductor 406 does not break into two parts before the direct current stops being applied so as to allow the following pulse waves to change the profiles of the fabricated nanoscale probe.

Referring to FIG. 4C, in some embodiments, according to the present disclosure with reference to FIG. 2 and FIGS. 3B and 3C, the power source 408 outputs a set of pulse waves with an on-time of T3 and an off-time of T4 (the first set of pulse waves) between the direct current and the set of pulse waves with the on-time T1 and off-time T2 (the second set of pulse waves) during the operation 330. The on-time T3 is between 1 nanosecond and 1 second, but is no shorter than the on-time T1. The off-time T4 is between 1 nanosecond and 100 microseconds, but is no longer than the off-time T2. The application of the first set of pulse waves serves to have the necking portion 4062 of the first conductor 406 etched more uniformly, and to reduce the fabrication time of the nanoscale probe. Alternatively, the first set of pulse waves may be replaced by an alternating current (AC).

Referring to FIG. 4C and according to some embodiments of the present disclosure, the timing for the power source 408 to stop outputting the first set of pulse waves and start outputting the second set of pulse waves can be adjusted freely as long as the first conductor 406 has not broken into two parts before the power source 408 outputs the second set of pulse waves. Such mechanism is to allow the second set of pulse waves to change the profiles of the fabricated nanoscale probe. Alternatively, an operator may stop the power source 406 from outputting the first set of pulse waves when the diameter of the necking portion 4062 of the first conductor is about 10 micrometers, which is the minimum length a human eye can discern through an optical microscope. Accordingly, the second set of pulse waves can be applied to control the profiles of the fabricated nanoscale probe before the first conductor 406 breaks into two parts.

According to some embodiments of the present disclosure, the nanoscale probe fabricated through the method 300 by applying different types and/or combinations of outputs from the power source 408, according to FIGS. 4A-4C, has a tip length Ltip between 100 micrometers and 1 centimeter, and a body diameter Lbody between 2 micrometers and 10 millimeter. An aspect ratio of such nanoscale probe 100 is no greater than 1000. In addition, such nanoscale probe 100 has a tip radius of curvature between 4 nanometers and 50 nanometers, and a tip taper angle between 3 degrees and 20 degrees. According to some other embodiments of the present disclosure, the nanoscale probe fabricated through the method 300 by applying different types and/or combinations of outputs from the power source 408, according to FIGS. 4A-4C, has a tip length Ltip between 100 micrometers and 1 millimeter, and a body diameter Lbody between 2 micrometers and 10 micrometers. An aspect ratio of such nanoscale probe 100 is between 1.6 and 100. According to additional embodiments of the present disclosure, such nanoscale probe 100 has a tip radius of curvature no greater than 10 nanometers, and a tip taper angle between 3 degrees and 5 degrees.

According to some embodiments of the present disclosure, the electrochemical nanoscale probe fabrication method provides an operator with control of the fabricated nanoscale probes. For example, by applying different voltages, nanoscale probes of different degrees of roughness can be fabricated. By applying different durations of direct current, nanoscale probes of different tip lengths can be fabricated. By applying different pulse wave on-time durations, nanoscale probes of different tip radiuses of curvature and tips with taper angles can be fabricated. By applying different numbers of pulse waves after the first conductor 406 breaks into two parts, nanoscale probes of different tip taper angles can be fabricated.

Although the embodiments and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for fabricating a nanoscale probe, comprising:
immersing a first conductor into an electrolyte, wherein the first conductor is connected to an anode;
immersing a second conductor into the electrolyte, wherein the second conductor is connected to a cathode;
forming a necking portion at the first conductor approximately near the surface of the electrolyte by a power source outputting a direct current voltage establishing an electrical circuit between the first conductor and the second conductor; and
delivering a plurality of voltage pulses by the power source to reduce the dimension of the necking portion, wherein the electrical circuit is not terminated before the first conductor breaks substantially from the necking portion,
wherein the nanoscale probe has a body and a tip protruding from the body,
wherein profiles of the nanoscale probe include at least a radius of curvature of the tip, a taper angle of the tip, a length of the tip, an aspect ratio of the nanoscale probe, and a diameter of the body,
wherein the nanoscale probe having predetermined profiles is fabricated by adjusting the establishment of the electrical circuit between the first conductor and the second conductor.

2. The method according to claim 1, wherein the electrolyte is a potassium hydroxide (KOH) solution having a concentration of more than about 0.1 M, or a sodium hydroxide (NaOH) solution having a concentration of more than about 0.1 M.

3. The method according to claim 1, wherein the electrical circuit is continued after the first conductor breaks substantially from the necking portion.

4. The method according to claim 1, wherein a potential difference of each of the plurality of pulses is between about 1V and about 50V.

5. The method according to claim 1, wherein the direct current voltage precedes the plurality of voltage pulses.

6. The method according to claim 1, wherein a duration of on-time of each of the plurality of voltage pulses is between about 1 nano-second and about 1 second, and a duration of off-time between each of the plurality of voltage pulses is more than about 1 nano-second.

* * * * *